(12) United States Patent
Naya

(10) Patent No.: US 6,584,062 B1
(45) Date of Patent: Jun. 24, 2003

(54) NEAR-FIELD OPTICAL RECORDING APPARATUS ASSISTIVELY HEATING RECORDING MEDIUM

(75) Inventor: Masayuki Naya, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/500,223

(22) Filed: Feb. 8, 2000

(30) Foreign Application Priority Data

Feb. 8, 1999 (JP) .......................... 11-030241

(51) Int. Cl.$^7$ ................................ G11B 7/00
(52) U.S. Cl. ................... 369/112.27; 369/13.33
(58) Field of Search ................ 369/13.33, 112.27, 369/118, 14, 112.2, 47.12, 126

(56) References Cited

U.S. PATENT DOCUMENTS

| | | | |
|---|---|---|---|
| 5,627,815 A | 5/1997 | Koyanagi et al. | 369/126 |
| 5,689,480 A | 11/1997 | Kino | 369/14 |
| 6,069,853 A * | 5/2000 | Novotny et al. | 369/13.33 |
| 6,396,783 B1 * | 5/2002 | Bell et al. | 369/13.33 |
| 6,407,884 B1 * | 6/2002 | Osborne et al. | 360/114.01 |

FOREIGN PATENT DOCUMENTS

| | | | |
|---|---|---|---|
| EP | 0 469 879 A2 | 2/1992 | G11B/9/00 |
| EP | 0 899 721 a1 | 3/1999 | G11B/5/02 |
| JP | 07192280 | * 7/1995 | |
| JP | 07225975 | * 8/1995 | |
| WO | 99/41741 | 8/1999 | G11B/7/00 |

OTHER PUBLICATIONS

Japanese Abstract No. 10222885, dated Aug. 21, 1998.
Japanese Abstract No. 60212843, dated Oct. 25, 1985.
Japanese Abstract No. 60205528, dated Oct. 17, 1985.
Japanese Abstract No. 08306062, dated Nov. 22, 1996.
Japanese Abstract No. 08315434, dated Nov. 29, 1996.

* cited by examiner

Primary Examiner—Thang V. Tran
Assistant Examiner—Kimlien T. Le
(74) Attorney, Agent, or Firm—Sughrue Mion, PLLC

(57) ABSTRACT

A near-field optical recording apparatus for recording information in a recording medium, and a near-field optical recording and regenerating apparatus for recording information in a recording medium, and reading the information recorded in the recording medium. The apparatuses contain a light source which generates recording light; a microaperture probe which has at an end thereof a light-pass aperture having a diameter smaller than a wavelength of the recording light, receives from the other end thereof the recording light, and radiates near-field light on a portion of the recording medium to record the information; and an assistive heating unit which is capable of assistively heating at least the above portion of the recording medium for a duration corresponding to radiation of the near-field light on the portion. The near-field optical recording and regenerating apparatus further radiates near-field light onto a portion of the recording medium to read the recorded information, and contains a control unit which activates the assistive heating unit when recording the information, and deactivates the assistive heating unit when reading the information.

6 Claims, 3 Drawing Sheets

NEAR-FIELD OPTICAL RECORDING APPARATUS ASSISTIVELY HEATING RECORDING MEDIUM

BACKGROUND OF THE INVENTION

1. Field of the Invention

The present invention relates to a near-field optical recording apparatus which records information in a recording medium by utilizing near-field light emitted from a micro-aperture probe. The present invention also relates to a near-field optical recording and regenerating apparatus which records information in a recording medium and reading the recorded information by utilizing near-field light emitted from a micro-aperture probe.

2. Description of the Related Art

Conventionally, a near-field scanning optical microscope such as the photon scanning tunnelling microscope is known as an apparatus enabling analysis of shapes and structures of a specimen, which are smaller than a wavelength of light. The near-field scanning optical microscope emits near-field (evanescent field) light from a micro-aperture probe, and detects intensity of scattered light generated by interaction of the near-field light with a surface of a specimen, i.e., by disturbance of the near-field light by the surface of the specimen. The near-field scanning optical microscope scans the surface of the specimen with the micro-aperture probe and time-sequentially obtains a scattered-light-intensity detection signal as a function of the position of the micro-aperture probe. Thus, information on the shapes and structures of the surface of the specimen is obtained.

The above micro-aperture probe is usually produced by tapering an end portion of an optical fiber, forming a metal film by vapor deposition, and then removing the tip portion of the metal film to produce an aperture.

As an application of the above near-field scanning optical microscope, an apparatus for recording information in a recording medium by utilizing near-field light radiated from a micro-aperture probe is proposed. Although the power of the near-field light radiated from the micro-aperture probe is very small, the power density is considerably great. Therefore, it is possible to utilize a heating effect of the near-field light to produce a hole on a surface of ablative material or change the phase of phase-change material, for example, from a crystal phase to an amorphous phase. Since the near-field light is radiated from the micro aperture of a size smaller than a wavelength of light, it is possible to form as a pit a hole or an amorphous area having a size smaller than the wavelength of light, regardless of the diffraction limit of the light. Thus, recording with extremely high density is realized.

When reading the recorded information, the pit formed as above can also be read by utilizing the micro-aperture probe. For example, a hole formed in ablative material can be detected by adopting the aforementioned technique for measuring the fine shapes in the near-field scanning optical microscope. Therefore, a near-field optical recording and regenerating apparatus having the above micro-aperture probe for recording and reading information is proposed.

In order to achieve high reliability in the recording operation by the above near-field optical recording apparatus and near-field optical recording and regenerating apparatus, it is necessary to increase the power of the near-field light to a sufficient value which enables formation of a satisfactory pit realized by a hole or amorphous area. Although the power can be increased by supplying a sufficiently high power to the micro-aperture probe, the micro-aperture probe is liable to break when the power of the near-field light is increased.

SUMMARY OF THE INVENTION

The object of the present invention is to provide a near-field optical recording apparatus or a near-field optical recording and regenerating apparatus which forms a satisfactory pit so as to enable highly reliable recording even when the power of the near-field light is low.

In order to accomplish the above-mentioned object, according to the first aspect of the present invention, there is provided a near-field optical recording apparatus recording information in a recording medium. The near-field optical recording apparatus contains a light source which generates recording light; a micro-aperture probe which has at an end thereof a light-pass aperture having a diameter smaller than a wavelength of the recording light, receives from the other end thereof the recording light, and radiates near-field light on a portion of the recording medium to record the information; and an assistive heating unit which assistively heats at least the above portion of the recording medium for a duration corresponding to radiation of the near-field light on the portion.

In order to accomplish the above-mentioned object, according to the second aspect of the present invention, there is provided a near-field optical recording and regenerating apparatus for recording information in a recording medium, and reading the information recorded in the recording medium. The near-field optical recording and regenerating apparatus contains a light source which generates recording light; a micro-aperture probe which has at an end thereof a light-pass aperture having a diameter smaller than a wavelength of the recording light, receives from the other end thereof the recording light, and radiates near-field light on a portion of the recording medium to record and read the information; an assistive heating unit which is capable of assistively heating at least the above portion of the recording medium for a duration corresponding to radiation of the near-field light on the portion; and a control unit which activates the assistive heating unit when recording the information, and deactivates the assistive heating unit when reading the information.

In the first and second aspects of the present invention, the above duration corresponding to radiation may include a time preceding the radiation of the near-field light on the portion. That is, the above heating operation may be performed before the radiation of the near-field light on the portion.

Alternatively, in the first and second aspects of the present invention, the above duration corresponding to radiation may include a duration of radiation of the near-field light on the portion. That is, the above heating operation may be performed at the same time as the radiation of the near-field light on the portion.

Since, according to the present invention, the radiated portion is assistively heated for a duration corresponding to the radiation, both the energy of the assistive heating and the energy of the near-field light contribute to the recording. Therefore, even when the power of the near-field light is low, a satisfactory pit can be formed to enable highly reliable recording.

Generally, when recording information in a recording medium by radiation of light on the recording medium which is made of an ablative or phase-change material, and reading the recorded information therefrom, energy needed for reading the recorded information is smaller than energy needed for recording the information. Since, according to the present invention, the assistive heating unit is activated at least during the recording operation, and deactivated during the reading operation, it is not necessary to change the intensity of the near-field light. That is, even when the intensity of the near-field light is maintained so as to be constant, the energy supplied to a portion of the recording medium for reading the recorded information can be made smaller than the total energy supplied to a portion of the recording medium for recording the information.

DESCRIPTION OF PREFERRED EMBODIMENTS

Embodiments of the present invention are explained in detail below with reference to drawings.

First Embodiment

Figure 1:
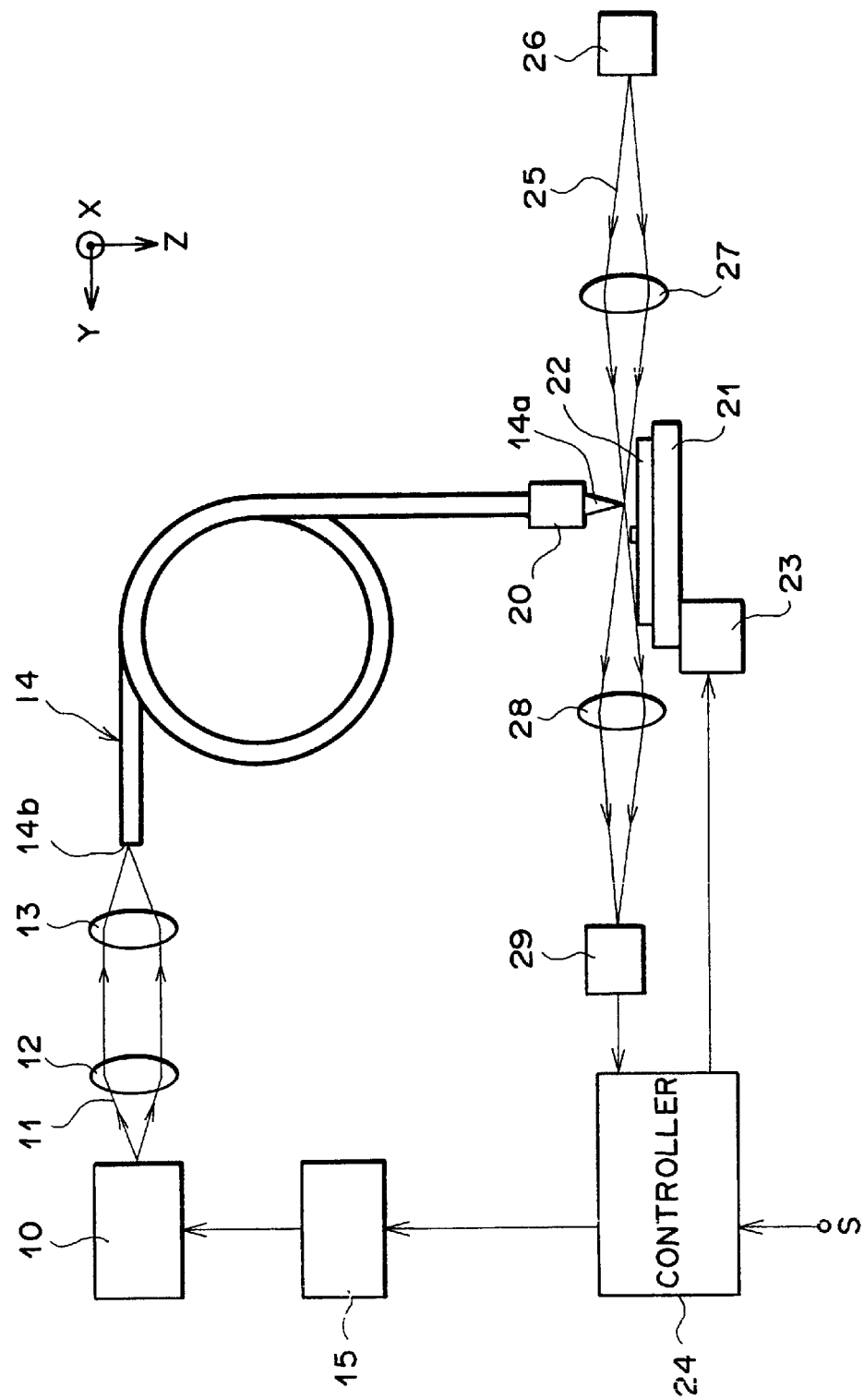
FIG. 1 is a side view of a near-field optical recording apparatus as the first embodiment of the present invention.

FIG. 1 shows a construction of a near-field optical recording apparatus as the first embodiment of the present invention. The near-field optical recording apparatus of FIG. 1 contains a laser device 10, a collimator lens 12, a condenser lens 13, a micro-aperture probe 14a, and an optical fiber 14. The laser device 10 as a recording light source is, for example, a semiconductor laser device, and emits a laser beam 11 as recording light. The collimator lens 12 collimates the laser beam 11, and the condenser lens 13 condenses the collimated laser beam. The optical fiber 14 has a micro-aperture probe 14a at an end thereof. The laser device 10 is driven by a laser driving circuit 15, and the operation of the laser driving circuit 15 is controlled by a controller 24.

A piezo element 20 is attached to the tip of the micro-aperture probe 14a. A recording medium 22 is placed on a turntable 21, and is located in close proximity to the tip of the micro-aperture probe 14a. The turntable 21 rotates the recording medium 22, and is driven by a turntable driving unit 23 so that the turntable 21 can be moved in x, y, and z directions in three-dimensional space, where the turntable driving unit 23 moves the turntable 21, for example, by using a piezo element. The operation of the turntable driving unit 23 is also controlled by the controller 24.

In addition, the near-field optical recording apparatus has a second laser device 26, a second condenser lens 27, a third condenser lens 28, and an optical detector 29. The second laser device 26 emits a laser beam 25 for use in controlling the position of the turntable 21 in the z direction. The second condenser lens 27 condenses the laser beam 25 so that the laser beam 25 converges at the tip of the micro-aperture probe 14a. The third condenser lens 28 condenses the laser beam 25 after the above convergence at the tip of the micro-aperture probe 14a. The optical detector 29 detects the laser beam 25 condensed by the third condenser lens 28. The detection result of the optical detector 29 is supplied to the controller 24.

The above micro-aperture probe 14a has a micro aperture having a diameter smaller than the wavelength of the light. The diameter is, for example, a few nanometers. As illustrated in detail in FIG. 2, the micro aperture can be formed, for example, by tapering a core 14c of an optical fiber 14 to a point, and forming a metal film by vapor deposition, and then removing the tip portion of the metal film.

Figure 2:
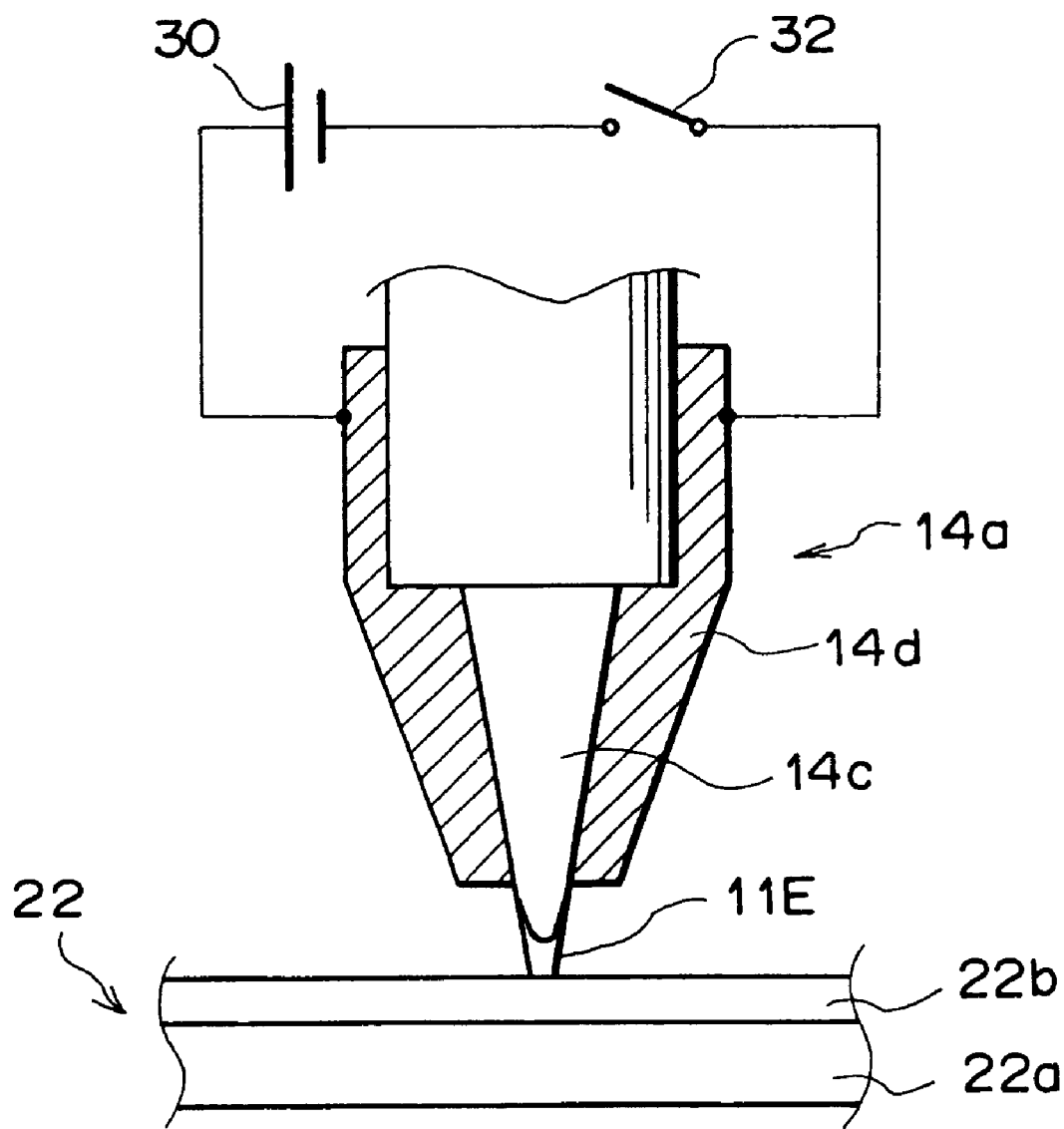
FIG. 2 is a cutaway side view of essential portions of the near-field optical recording apparatus of FIG. 1.

In addition, as illustrated in FIG. 2, the metal film 14d is connected to a direct-current power supply 30 through a switch 32. The metal film 14d, the direct-current power supply 30, and the switch 32 constitute the aforementioned assistive heating unit. On the other hand, the recording medium 22 is made of a base 22a, and a recording layer 22b, which is supported by the base 22a. The recording layer 22b is a thin film made of ablative material which can be bored by heat.

The operations of the near-field optical recording apparatus are explained below. The laser beam 11 is converged by the condenser lenses 12 and 13 at the other end 14b of the optical fiber 14. Then, the converged laser beam 11 enters the optical fiber 14, and propagates therethrough. Thus, as illustrated in FIG. 2, evanescent light 11E is radiated from the micro aperture of the micro-aperture probe 14a onto the recording layer 22b of the recording medium 22 to form a hole (pit) in the recording layer 22b.

The operation of the laser device 10 is controlled by the controller 24 based on a signal S, which is, for example, an image signal, a sound signal, or the like. That is, the laser beam 11 which enters the optical fiber 14 is controlled in accordance with the signal S. Thus, a set of pits which represent the signal S by existence, absence, and intervals thereof can be formed. Since the evanescent light 11E radiated through the micro aperture of the size smaller than the wavelength of the light is used, it is possible to form a pit having a size smaller than the wavelength of the light, regardless of the diffraction limit of the light. Thus, recording at extremely high density is realized.

When recording information as described above, it is necessary to maintain the distance between the tip of micro-aperture probe 14a and the turntable 21 to be constant. The operation for maintaining this distance is explained below.

The tip of the micro-aperture probe 14a is resonantly vibrated by using the aforementioned piezo element 20, which is attached to the tip of the micro-aperture probe 14a. While resonantly vibrating the tip of the micro-aperture probe 14a, the turntable 21 is raised and lowered by the turntable driving unit 23 to vary the distance between the tip of the micro-aperture probe 14a and the surface of the recording medium 22. When the distance between the tip of the micro-aperture probe 14a and the surface of the recording medium 22 becomes smaller than a certain distance, a van der Waals force is exerted between the tip of the micro-aperture probe 14a and the surface of the recording medium 22. As a result, a shear force is exerted on the micro-aperture probe 14a. Since the amplitude of the vibration varies with the shear force, the amplitude of the vibration of the micro-aperture probe 14a is measured by converging the laser beam 25 at the tip of the micro-aperture probe 14a, and detecting diffracted light of the converged laser beam 25 by the optical detector 29. Since the amplitude of the vibration depends on the distance between the tip of the micro-aperture probe 14a and the surface of the specimen, the distance between the tip of the micro-aperture probe 14a and the surface of the specimen can be maintained so as to be constant by appropriately controlling the turntable driving unit 23 using the controller 24.

Next, explanations are provided on the assistive heating operation of the recording medium 22. During a series of operations for recording information in the recording medium 22, the aforementioned switch 32 is closed to connect the metal film 14d of the micro-aperture probe 14a to the direct-current power supply 30. When a current is supplied to the metal film 14d, the metal film 14d generates heat, and the recording medium 22 is heated mainly by heat conduction and additionally by heat radiation.

Thus, when the evanescent light is radiated onto a portion of the recording layer 22b of the recording medium 22, at least this portion of the recording layer 22b is additionally heated as described above. When the recording layer 22b is assistively heated, the recording operation is achieved by both the energy of the above assistive heating and the energy of the evanescent light 11E. Therefore, even when the power of the evanescent light 11E is low (i.e., even when the power of the laser beam 11 input into the optical fiber 14 is low), a satisfactory pit can be formed so that highly reliable recording is realized.

The above assistive heating operation may be continued during the series of operations for recording information. Alternatively, the micro-aperture probe 14a may be heated in synchronization with the radiation of the evanescent light 11E on the recording medium 22 so that the assistive heating operation is performed at the same time as the radiation of the evanescent light 11E.

Second Embodiment

The second embodiment is explained below with reference to FIG. 3. Elements in FIG. 3 which have the same reference numerals as FIG. 2 function in the same way as the corresponding elements in FIG. 2. Therefore, the descriptions of those elements are not repeated here.

In the second embodiment, a second laser device 41 is provided, as the assistive heating unit, for emitting a second laser beam 40. The second laser beam 40 is condensed by the condenser lens 42 so that an area of the recording medium 22 is radiated by the second laser beam 40 and assistively heated by the second laser beam 40, where the area radiated by the second laser beam 40 is larger than the area on which the evanescent light 11E is radiated.

Other Embodiments

Figure 3:
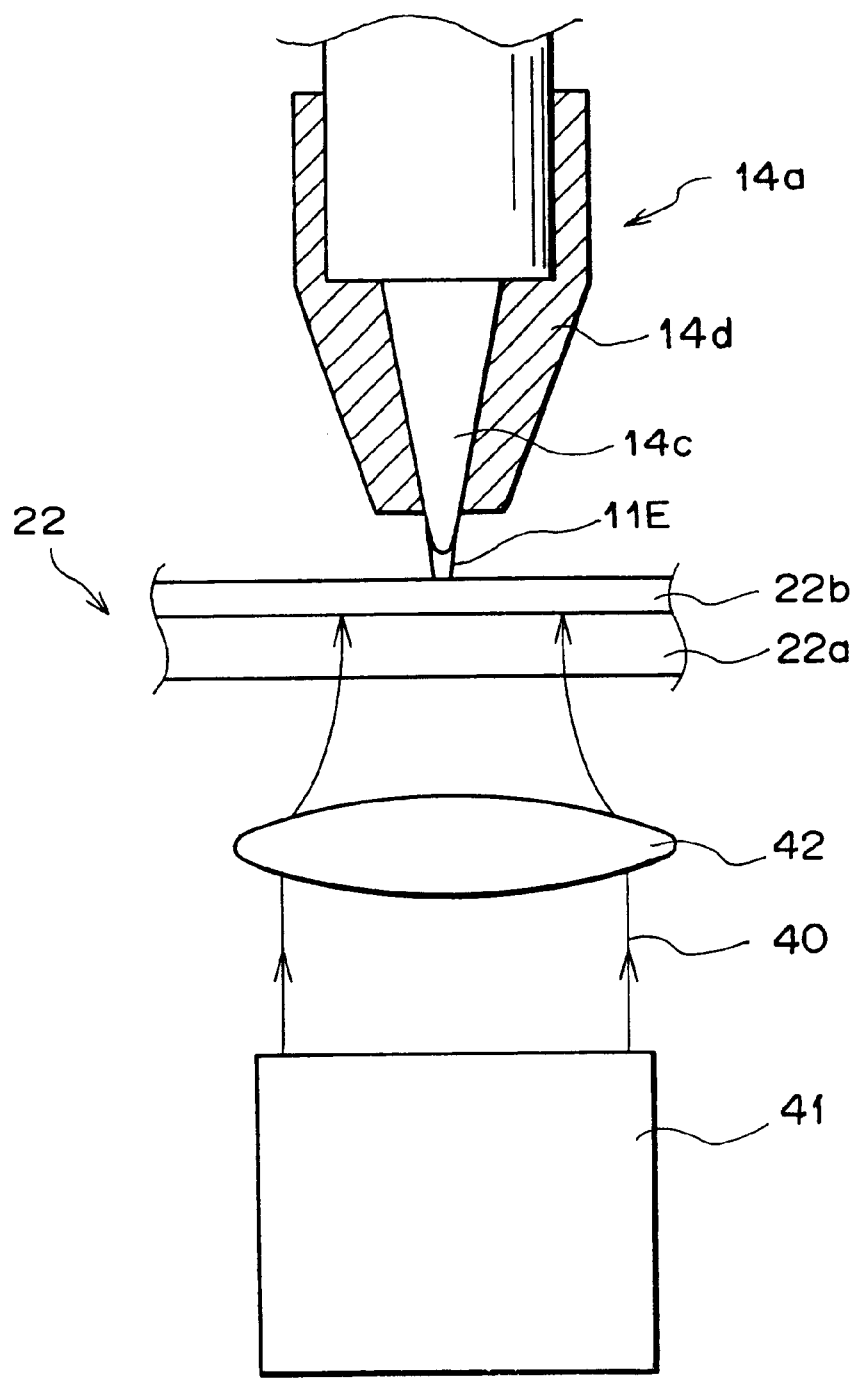
FIG. 3 is a cutaway side view of essential portions of the near-field optical recording apparatus as the second embodiment of the present invention.

The above features of the first and second embodiments as illustrated in FIGS. 2 and 3 may also be provided in near-field optical recording and regenerating apparatuses according to the second aspect of the present invention, which record information in a recording medium made of ablative or phase-change material by radiating near-field light thereon, and reading the information recorded in the recording medium by radiating near-field light thereon. That is, the same advantages as the first and second embodiments are obtained in the near-field optical recording and regenerating apparatuses according to the second aspect of the present invention.

When the aforementioned assistive heating unit is activated before and/or at the same time as the recording operation, and deactivated before and/or at the same time as the reading operation in the above near-field optical recording and regenerating apparatuses, it is not necessary to change the intensity of the near-field light. That is, even when the intensity of the near-field light is maintained so as to be constant, the energy supplied to a portion of the recording medium for reading the recorded information can be made smaller than the total energy supplied to a portion of the recording medium for recording the information.

In addition, all of the contents of the Japanese Patent Application, No. 11(1999)-30241 are incorporated into this specification by reference.

What is claimed is:

1. A near-field optical recording apparatus for recording information in a recording medium, said near-field optical recording apparatus comprising:

a light source which generates recording light;

a micro-aperture probe which has at an end thereof a light-pass aperture having a diameter smaller than a wavelength of said recording light, receives from another end thereof said recording light, and radiates through said light-pass aperture near-field light onto a portion of said recording medium to record the information; and a heating unit which assistively heats at least said portion of said recording medium at least for a duration corresponding to radiation of the near-field light on the portion.

2. A near-field optical recording apparatus according to claim 1, wherein said duration corresponding to radiation includes a time preceding the radiation of the near-field light on the portion.

3. A near-field optical recording apparatus according to claim 1, wherein said duration corresponding to radiation includes a duration of the radiation of the near-field light the portion.

4. A near-field optical recording and regenerating apparatus for recording information in a recording medium, and reading said information recorded in the recording medium, said near-field optical recording and regenerating apparatus comprising:

a light source which generates recording light;

a micro-aperture probe which has at an end thereof a light-pass aperture having a diameter smaller than a wavelength of said recording light, receives from another end thereof said recording light, and radiates near-field light onto a portion of said recording medium to record and read the information;

a heating unit which is operative to assistively heat at least said portion of said recording medium at least for a duration corresponding to radiation of the near-field light on the portion; and a control unit which activates said heating unit when recording the information, and deactivates said heating unit when reading the information.

5. A near-field optical recording and regenerating apparatus according to claim 4, wherein said duration corresponding to radiation includes a time preceding the radiation of the near-field light on the portion.

6. A near-field optical recording and regenerating apparatus according to claim 4, wherein said duration corresponding to radiation includes a duration of radiation of the near-field light on the portion.

* * * * *